United States Patent [19]

Tokumaru

[11] Patent Number: 4,817,031

[45] Date of Patent: Mar. 28, 1989

[54] ADDER

[75] Inventor: Takeji Tokumaru, Yokohama, Japan

[73] Assignee: Kabushiki Kaisha Toshiba, Kawasaki, Japan

[21] Appl. No.: 101,425

[22] Filed: Sep. 28, 1987

[30] Foreign Application Priority Data

Sep. 27, 1986 [JP] Japan .............................. 61-227109

[51] Int. Cl.$^4$ ................................................ G06F 7/50
[52] U.S. Cl. .................................................... 364/787
[58] Field of Search .................... 364/784, 786–788, 364/768

[56] References Cited

U.S. PATENT DOCUMENTS 3,728,532 4/1973 Pryor .................................. 364/787
4,764,887 8/1988 Lai et al. ............................ 364/787

FOREIGN PATENT DOCUMENTS 0143456 6/1985 European Pat. Off. ............ 364/784
0147836 7/1985 European Pat. Off. ............ 364/787
60-134932 7/1985 Japan ................................. 364/786

Primary Examiner—Gary V. Harkcom
Assistant Examiner—Dale M. Shaw
Attorney, Agent, or Firm—Foley & Lardner, Schwartz, Jeffery, Schwaab, Mack, Blumenthal & Evans

[57] ABSTRACT

In a carry adder of Manchester type, a carry is generated for each full adder and transmitted from a less significant bit to a more significant bit via a series-connected pass transistors. To increase the carry transmission speed, a carry skip circuit is usually connected across pass transistors classified as a block. However, since the skip circuit is still connected to turn-on resistances and stray capacitances of the pass transistors, the carry transmission speed is low and unstable. To overcome this problem, the skip circuit is selectively disconnected from the pass transistors, in response to a NAND signal indicative of the absence of carry signals of the full adder in the same block, by means of two mate clocked inverters alternatively activated by two opposite-level clocks $\phi$ and $\bar{\phi}$.

3 Claims, 4 Drawing Sheets

ADDER

BACKGROUND OF THE INVENTION

1. Field of the Invention

The present invention relates generally to an adder and more specifically to a high-speed carry adder of a relatively simple circuit configuration.

2. Description of the Prior Art

Conventionally, a carry adder of Manchester type has been well known, which comprises a plurality of full adder for each generating a carry signal or transmitting a carry signal from a less significant bit to a more significant bit, in spite of a relatively simple circuit configuration.

A carry is transmitted from a less significant bit to a more significant bit through a plurality of series-connected pass transistors. Therefore, the carry transmission time is subjected to the influence of the turn-on resistances and stray capacitances of the pass transistors. As a result, when the number of series-connected pass transistors increases, the carry transmission speed is reduced.

To overcome this problem, a skip circuit is usually connected across the full adders in a block to skip a carry over the series-connected pass transistors. However, since the turn-on resistances of and the stray capacitances of the pass transistors are still connected to the output of the skip circuit as a load, the carry transmission speed is subjected to the influence of the potential level of a carry to be transmitted and the potential level of the stray capacitances of the pass transistors, thus resulting in a problem such that it is impossible to transmit a carry signal at high constant speed from a full adder of the preceding less significant bit block to a full adder of the succeeding more significant bit block, irrespective of the potential levels of the carry and the stray capacitance of the pass transistors which constitute the carry adder.

A more detailed description of the prior-art carry adder of Manchester type will be made hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide an adder which can always transmit carry signals at a high constant speed, that is, achieve addition operation stably at high speed.

To achieve the above-mentioned object, an adder of the present invention comprises:

(a) a plurality of full adders connected in series as a block, for each generating a carry on the basis of two addition information to be added; (b) a plurality of carry transmitters for each transmitting a carry generated from a full adder for a less significant bit to a full adder for a more significant bit, when a carry is generated in said full adder in the same block; (c) a carry skip circuit connected across said full adders connected in series as a block, for skipping a carry generated from a full adder of a preceding less significant bit block to a full adder of a succeeding more significant bit block when no carry is generated from said full adders in the same block; and (d) means for disconnecting said carry skip circuit from said carry transmitters when no carry is generated from said full adders in the same block in skip operation.

The disconnecting means comprises (a) a first clocked inverter connected to the carry skip circuit and turned on in response to a "1"-level clock signal $\phi$ indicative of no carry from the full adders in the same block and a "0"-level inverted clock signal $\overline{\phi}$; and a second clocked inverter connected to the carry transmitter and turned on in response to a "0"-level clock signal $\phi$ and a "1"-level inverted clock signal $\overline{\phi}$.

Each clocked inverter is made up of two PMOS transistors and two NMOS transistors.

BRIEF DESCRIPTION OF THE DRAWINGS

The features and advantages of the adder of the present invention over the prior-art adder will be more clearly appreciated from the following description of the preferred embodiment of the invention taken in conjunction with the accompanying drawings in which like reference numerals designate the same or similar elements or sections throughout the figures thereof and in which.

DETAILED DESCRIPTION OF THE PREFERRED EMBODIMENT

To facilitate understanding of the present invention, a reference will be made to a prior-art adder with reference to the attached drawings.

Figure 1:
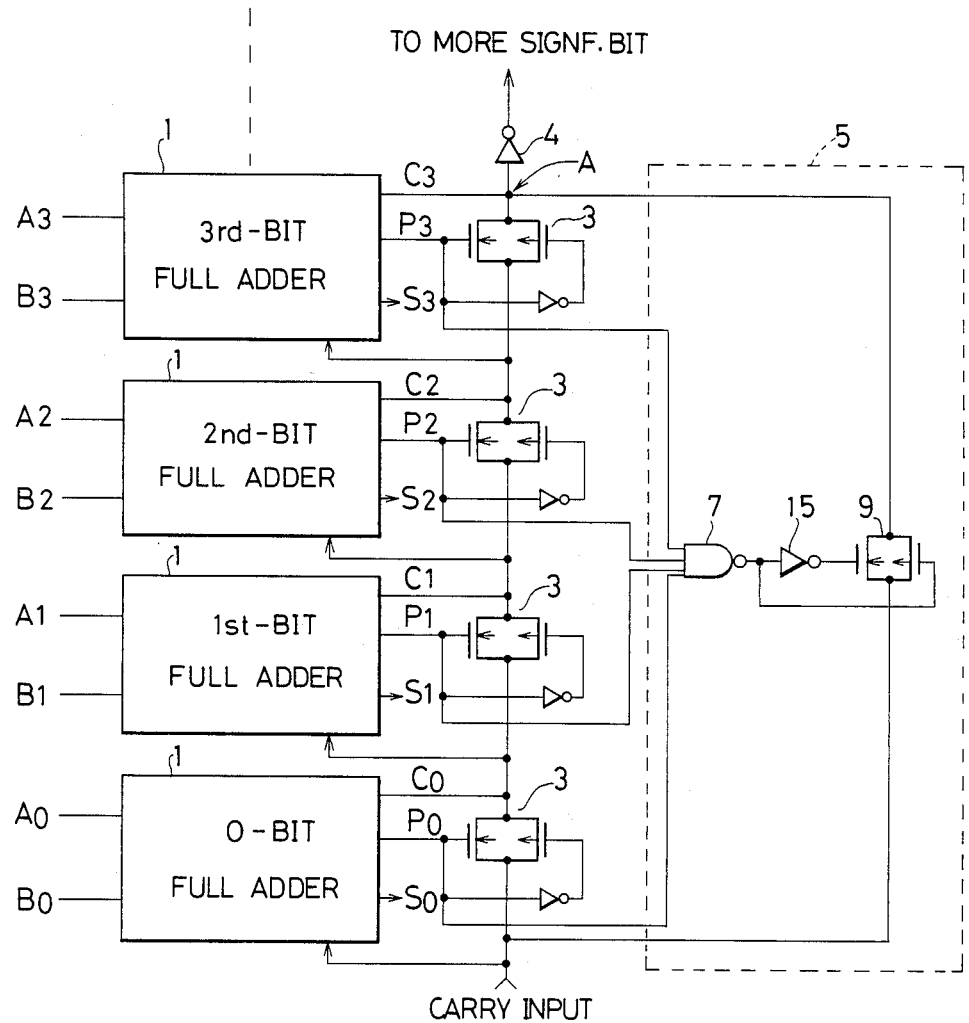
FIG. 1 is a circuit diagram showing an example of prior-art adder.

FIG. 1 shows an example of the Manchester-type carry adder (referred to as an adder, hereinafter) which can implement 4-bit (0 to 3 bits) additions. In the drawing, when two values ($A_3$, $A_2$, $A_1$, $A_0$) and ($B_3$, $B_2$, $B_1$, $B_0$) to be added are given to four series-connected full adders 1 being classified into four bits, an addition can be effected in each full adder to obtain a sum S (an addition result) of two data. In this addition operation, when a carry is generated, the carry is sent to a more significant bit; or when no carry is generated, a carry generated at a less significant bit is transmitted to a more significant bit.

The generation and transmission of a carry is determined by two addition information A and B. In more detail, each full adder 1 implements exclusive OR calculation (A $\oplus$ B) of two addition information A and B. If A=B="1", the calculation result is P="0", and a carry signal "1" is applied to a more significant bit. If A=B="0", the calculation result is also P="0", and a carry signal "0" is applied to a more significant bit. On the other hand, if A≠B, P="1", so that no carry is produced and another carry is transmitted from another less significant bit to another more significant bit.

The generated carry is transmitted to a more significant bit full adder 1 through pass transistors 3 and an inverter 4. The pass transistor 3 is composed of a P-channel MOS transistor (referred to as PMOS) and an N-channel MOS transistor (referred to as NMOS) by connecting the source terminal of one transistor to the drain terminal of the other transistor so as to be turned on in response to a calculated result P. Further, the inverter 4 is connected to shape the waveform of the carrier signal transmitted to a more significant bit.

In the prior-art adder as described above, there exists a problem such that the carrier transmit time is inevitably dependent upon turn-on resistances and stray capacitances of the PMOS and NMOS constituting the pass transistor 3 and therefore increases when the number of the series-connected pass transistors 3 increases, thus resulting in a large delay in carry transmission operation.

To reduce the delay time in the adder shown in FIG. 1, four full adders 1 for 0 to 3 bits are classified as a single block 1 for instance, and a skip circuit 5 is provided for each block. This skip circuit 5 transmits a carry by skipping over four pass transistors 3, when no carry is generated from all the 0 to 3 bit full adders 1 within the block, from a full adder of the preceding less significant bit block to a full adder of the succeeding more significant bit. In other words, when a NAND gate 7 detects $P_0 = P_1 = P_2 = P_3 = $ "1" (no carry is generated), a skip transistor 9 configured in the same way as the pass transistor 3 and connected in parallel to the four series-connected pass transistors 3 is turned on to directly transmit a carry across the four full adders 1 and the four pass transistor 3. In this case, since a carry can be skipped over the full adders 1, it is possible to transmit a carry from the preceding less significant bit full adder to the succeeding more significant bit full adder at a speed higher than the carry is transmitted through four series-connected pass transistors 3.

In the prior-art adder shown in FIG. 1, however, there still exists another problem such that carry transmit speed is not uniform and subjected to the influence of stray capacitances of the pass transistors.

Figure 2:
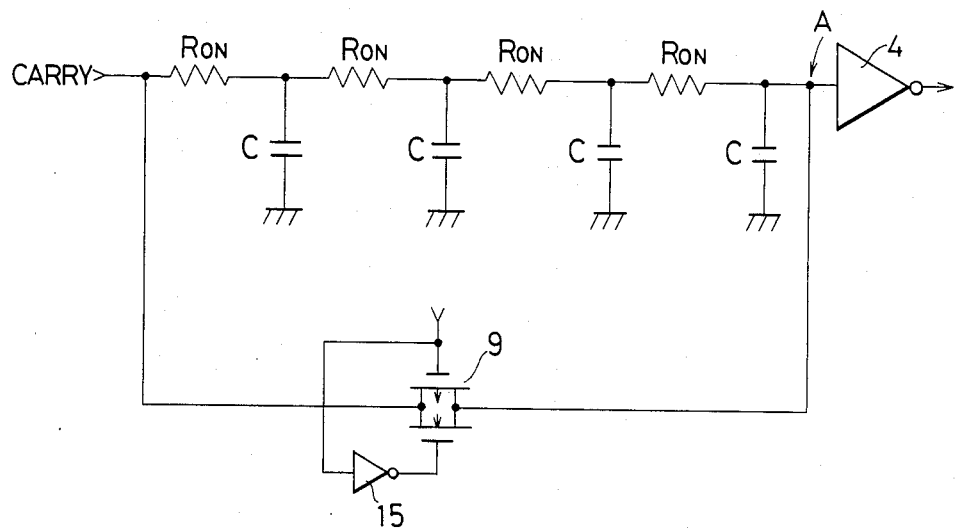
FIG. 2 is a part of the adder shown in FIG. 1, including a partial equivalent circuit thereof, for assistance in explaining a problem involved therein.

In more detail, when a carry is skipped, the skip transistor 9 and the four pass transistors 3 are all turned on because $P_0$, $P_1$, $P_2$ and $P_3$ are all at "1". Therefore, the turn-on resistances $R_{on}$ and the stray capacitances C of the four pass transistors 3 are connected to the point A as a load of the skip transistor 9 as shown in FIG. 2, so that the carry transmission speed is reduced.

Figure 3:
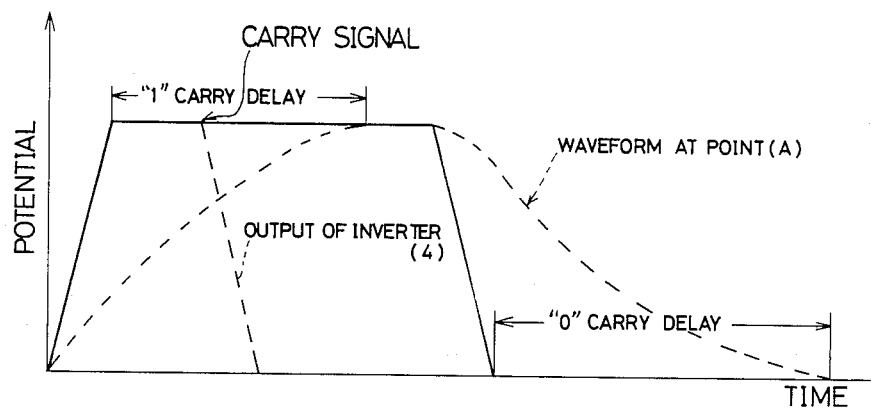
FIG. 3 is a waveform diagram showing a carry transmission speed of the adder shown in FIG. 1.

For instance, when a "0"-level carry signal is skipped to point A at which the potential is at "1"-level, the carry reaches the point A via the skip transistor 9 at a higher speed, as compared with the speed at which the carry reaches the same point via the four pass transistors 3. In this case, however, if the potential of each stray capacitances of each pass transistor 3 is at "1" level, the electric charge stored in each pass transistor 3 is partially discharged at the point A to which a "0"-level carry signal is transmitted through the skip transistor 9. Therefore, as shown in FIG. 3, the trailing edge of the potential at point A is delayed from that of the carry signal, thus resulting in a delay in transmitting a "0" carry signal.

In contrast with this, if the potential of each stray capacitances of each pass transistors 3 is at "0" level and a "1" carry is skipped, the leading edge of the potential at point A is delayed, and therefore the transmission of carry "1" is also delayed.

Further, when the voltage level of carry is the same as that of the stray capacitance of the pass transistor 3, the carry is transmitted at a higher speed.

As described above, in the prior-art adder including a skip circuit, since the pass transistors 3 are connected to the skip transistor 9 as a load, the transmission speed of a carry signal is directly dependent upon the electric charge of the pass transistors 3, so that there exists a problem in that the adder calculation speed cannot be improved especially when the potential level of a carry is different from that of the stray capacitance of the pass transistor 3 at point A.

Further, as shown in FIG. 1, an inverter 4 is connected to the point A to shape the waveform of a carry signal. Therefore, the output of the inverter 4 is also delayed due to the gate of the inverter 4, as shown in FIG. 3.

In view of the above description, reference is now made to an embodiment of the adder according to the present invention.

Figure 4:
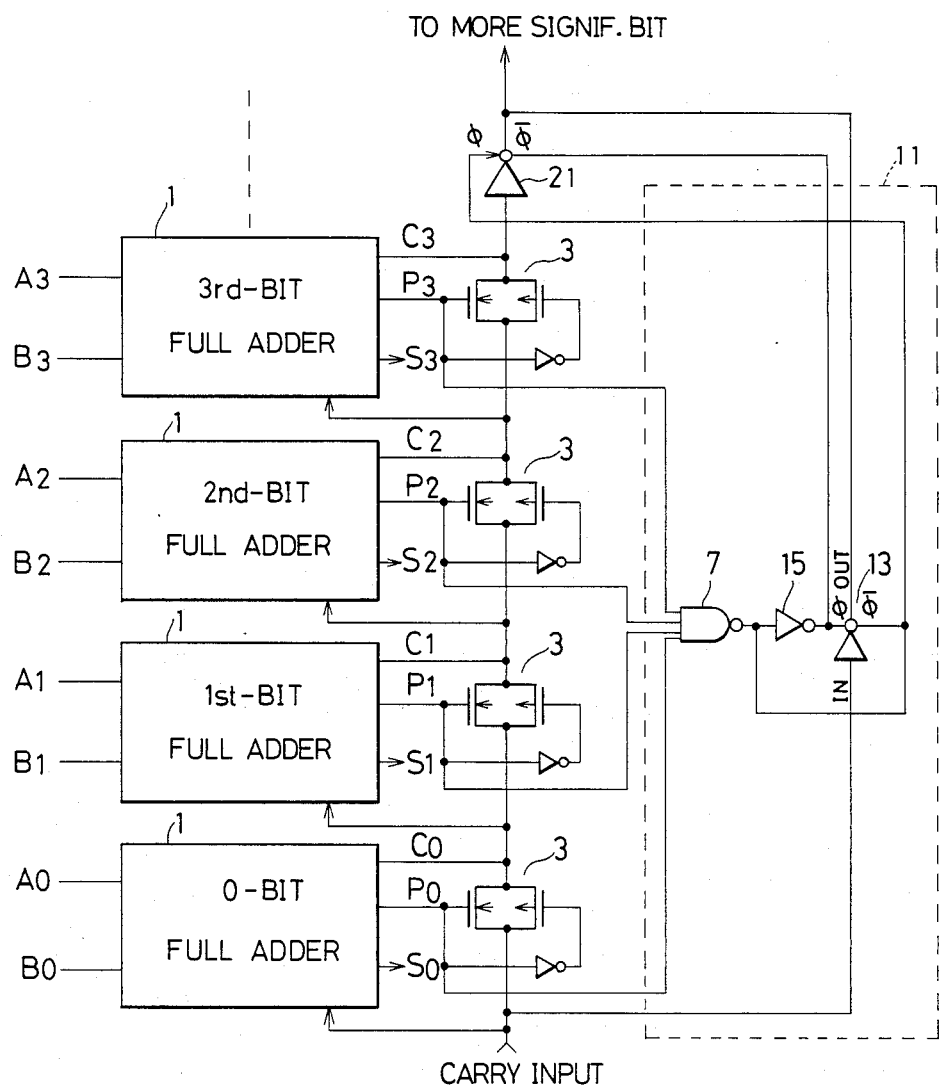
FIG. 4 is a circuit diagram showing an embodiment of an adder according to the present invention.

In FIG. 4, the adder according to the present invention comprises a skip circuit 11 which can isolate a carry transmission path of four series-connected pass transistors 3 from a carry skip transmission path, in order to eliminate unnecessary loads of the skip circuit 11. The skip circuit 11 comprises a NAND gage 7, an inverter 15, and a clocked inverter 13.

The conduction of the clocked inverter is controlled in response to both a clock signal $\phi$ and an inverted clock signal $\overline{\phi}$. That is, the clocked inverter operates as an ordinary inverter when $\phi$ is at "1" level and $\overline{\phi}$ is at "0" (i.e. turned on), but will not operate with a high impedance when $\phi$ is at "0" and $\overline{\phi}$ is at "1" (i.e. turned off).

Figure 5:
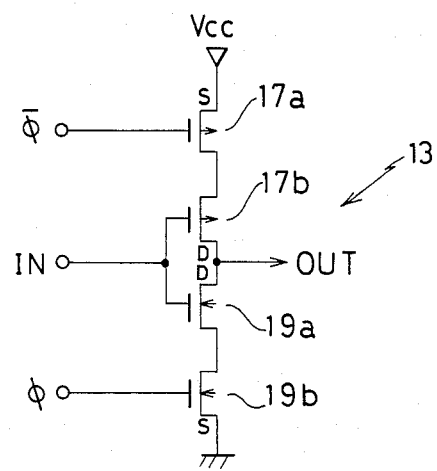
FIG. 5 is a circuit diagram showing an example of clocked inverter incorporated in the adder shown in FIG. 4.

FIG. 5 shows an example of clocked inverter 13 composed of two PMOS transistors 17a and 17b and two NMOSs transistors 19a and 19b. Four these MOSs are connected in series between the supply voltage Vcc and the ground in the order of PMOS 17a, PMOS 17b, NMOS 19a, and NMOS 19b. An inverted clock signal $\overline{\phi}$ is applied to the gate of PMOS 17a; a clock signal $\phi$ is applied to the gate of the NMOS 19b. An input signal is applied to the two gate terminals of the PMOS 17b and the NMOS 19a; an output signal is obtained from a junction point between the two drains of the PMOS 17b and the NMOS 19a.

Therefore, if $\overline{\phi} = $ "0" and $\phi = $ "1", PMOS 17a and NMOS 19b are both turned on, so that PMOS 17b and NMOS 19a operates as an ordinary inverter. Therefore A signal applied to the input IN is inversed and outputted from the output OUT.

In contrast with this, if $\overline{\phi} = $ "1" and $\phi = $ "0", PMOS 17a and NMOS 19b are both turned off, so that PMOS 17b and NMOS 19a are isolated from the supply voltage Vcc and the ground. Therefore, the output is kept at a high impedance irrespective of the level of an input signal.

With reference to FIG. 4 again, the clocked inverter 13 is turned on into skip operation to transmit a carry generated from a full adder of the preceding less significant bit block to a full adder of the succeeding more significant bit block. That is, a carry generated from the preceding less significant bit full adder is given as an input of the clocked inverter 13, and an output thereof is given to the succeeding more significant bit full adder as a carry.

The inverted clock signal $\overline{\phi}$ given to the clocked inverter 13 is an output of a NAND gate 7 to which four calculated results $P_0$ to $P_3$ are inputted. The clock signal $\phi$ is an output of an inverter 15 to which an output $\bar{\phi}$ of the NAND gate 7 is inputted.

In addition, another clocked inverter 21 is connected between the pass transistor 3 turned on or off in response to the calculated result $P_3$ of the third-bit full adder 3 and the clocked inverter 13. This second clocked inverter 21 is turned on or off with the output $\phi$ of the NAND gate 7 as a clock signal and with the output $\bar{\phi}$ of the inverter 15 as an inverted clock signal. Here, it should be noted that the two clocked inverters 13 and 21 are turned on or off in response to two opposite clock and inverted clock signals, respectively. Therefore, when the first clocked inverter 13 is on, the second clocked inverter 21 is off, or vice versa. In other words, when the calculated results $P_0$ to $P_3$ are all at "1" and therefore skip conditions are satisfied, the first clocked inverter 13 is turned on but the second clocked inverter 21 is turned off. That is, the transmission path through which a carry generated by the full adder 1 is passed is disconnected from the transmission path through which a carry generated from a less significant bit of the preceding block is passed, so that the resistances and the stray capacitances of the series-connected pass transistors 3 are isolated from a load of the first clocked inverter 13, that is, the skip circuit including the NAND gate 7 and the inverter 15.

The operation of the adder of the present invention will be described hereinbelow.

(1) When a carry is skipped over the pass transistors 3:

If addition information A and B is given to the four full adders 1 as $A_0 \neq B_0$, $A_1 \neq B_1$, $A_2 \neq B_2$, and $A_3 \neq B_3$, all the full adders 1 implement exclusive logical sum calculations $A \oplus B$. The calculated results $P_0$ to $P_3$ are all "1" and no carry is generated from all the full adders 1.

Therefore, all the pass transistors 3 are turned on; the output of the NAND gate 7 is "0"; the output of the inverter 15 is "1". As a result, a "1"-level clock signal $\phi$ and a "0"-level inverted clock signal $\bar{\phi}$ are applied to the first clocked inverter 13, so that the first clocked inverter 13 is turned on. Further, a "0"-level clock signal $\phi$ and a "1"-level inverted clock signal $\bar{\phi}$ are applied to the second clocked inverter 21, so that the second clocked inverter 21 is turned off.

Under these conditions, since the pass transistor 3 turned on in response to the calculated result $P_3$ is disconnected from the clocked inverter 13 in spite of the fact that all the pass transistors 3 are turned on, a carry transmitted from a full adder of the preceding less significant bit block is transmitted to a full adder of the succeeding more significant bit block through only the clocked inverter 13, without being subjected to the influence of the resistors and stray capacitances of the pass transistors 3.

(2) When a carry is not skipped over the pass transistors 3:

If addition information A and B is given to the four full adders 1 as $A = B$ in at least one of the four full adders 1, the calculated output of this full adder to which two signals $A = B$ are given is "0" and a carry is generated therefrom.

Therefore, at least one of the four pass transistors P is turned off; the output of the NAND gate 7 is "1". As a results, a "0"-level clock signal $\phi$ and a "1"-level inverted clock signal $\bar{\phi}$ are applied to the first clocked inverter 13, so that the first inverter 13 is turned off.

Further, a "1"-level clock signal $\phi$ and a "0"-level inverted clock signal $\bar{\phi}$ are applied to the second clocked inverter 21, so that the second clocked inverter 21 is turned on.

Under these conditions, a carry from a full adder of the preceding less significant bit block will not be skipped to a full adder of the succeeding more significant bit, but a carry generated from the full adder 1 is transmitted to the full adder of the succeeding more significant bit block via the second clocked inverter 21.

In the adder of the present invention, since a carry is transmitted via the clocked inverter 13, there exists a gate delay of the clocked inverter 13. However, in the prior-art adder shown in FIG. 1, since an inverter 4 is connected to the point A to shape the waveform of the carry, there also exists a delay due to this inverter 4. Therefore, the transmission of a carry signal is not so delayed by the gate of the clocked inverter 13 as to exceed the delay caused by the inverter 4 of the prior-art adder of wired-OR type shown in FIG. 1.

Figure 6:
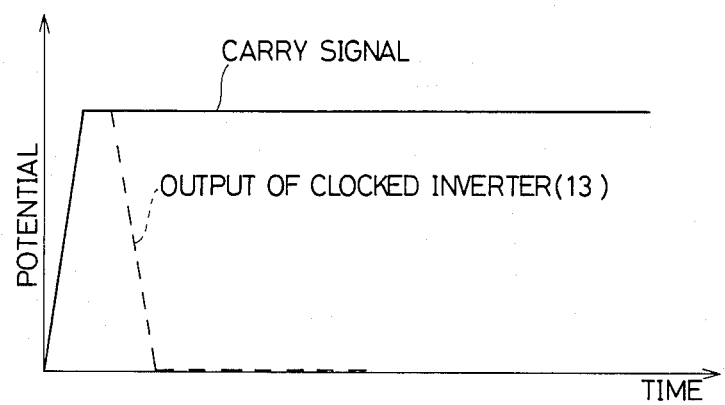
FIG. 6 is a waveform diagram showing a carry transmission speed in the adder of the present invention shown in FIG. 4.

In the prior-art adder, since the resistances $R_{on}$ and the stray capacitances C of the pass transistor 3 are connected to the skip transistor 9 as a load, the waveform-shaped carry signal (the output of the inverter 4) is greatly delayed after the carry signal has been inputted to the skip transistor 9 as shown in FIG. 3. However, in the adder of the present invention, since the first clocked inverter 13 is isolated from the pass transistors 3 by the second clocked inverter 21 in skip operation, the carry signal can be transmitted at a high speed as shown in FIG. 6, also in dependence upon the driving capability of the clocked inverter 13 itself.

In the above embodiment of the adder of the present invention, a carry signal has been skipped over four bits. However, without being limited thereto, it is possible to skip a carry signal over four or more bits. In this case, the carry transmission speed in skip operation is kept at a constant value, irrespective of the number of bits to be skipped.

As described above, in the adder according to the present invention, when a carry generated from a full adder of the less significant bit block is skipped over predetermined bits through a clocked inverter so as to be transmitted to a full adder of the succeeding more significant bit block, since the pass transistors are disconnected from the clocked inverter, it is possible to transmit the carry at a constant higher speed in skip operation and thus improving the operation speed of the addition calculation, without being subjected to the influence of the resistances and the stray capacitances of the pass transistors.

What is claimed is:

1. An adder comprising:
   (a) a plurality of full adders (1) connected in series as a block, for each generating a carry on the basis of two addition information (A, B) to be added;
   (b) a plurality of carry transmitters (3) for each transmitting a carry generated from a full adder for a less significant bit to a full adder for a more significant bit, when a carry is generated in said full adder in the same block;
   (c) a carry skip circuit (7, 15) connected across said full adders connected in series as a block, for skipping a carry generated from a full adder of a preceding less significant bit block to a full adder of a succeeding more significant bit block when no carry is generated from said full adders in the same block; and (d) means (13, 21) for disconnecting said carry skip circuit from said carry transmitters when no carry is generated from said full adders in the same block in skip operation.

2. The adder as set forth in claim 1, wherein said disconnecting means comprises:
   (a) a first clocked inverter (13) connected to said carry skip circuit (7, 15) so as to be turned on in response to a "1"-level clock signal $\phi$ indicative of absence of carry in said full adders in the same block and a "0"-level inverted clock signal $\overline{\phi}$; and
   (b) a second clocked inverter (21) connected to an output of said carry transmitter (3) so as to be turned off in response to a "0"-level clock signal $\phi$ indicative of absence of carry in said full adders and a "1"-level inverted clock signal $\overline{\phi}$.

3. The adder as set forth in claim 2, wherein said first and second clocked inverter (13, 21) comprises:
   (a) a first P-channel MOS transistor (17a) connected to a supply voltage Vcc and having a gate responsive to an inverted clock signal $\overline{\phi}$;
   (b) a second P-channel MOS transistor (17b) connected to said first P-channel MOS transistor and having a gate as an input terminal IN and a drain as an output terminal OUT;
   (c) a third N-channel MOS transistor (19a) connected to said second P-channel MOS transistor and having a gate as the same input terminal IN and a drain as the same output terminal OUT; and
   (d) a fourth N-channel MOS transistor (19b) connected to said third N-channel MOS transistor and ground and having a gate responsive to a clock signal $\phi$.

* * * * *